(12) United States Patent
Vashishtha et al.

(10) Patent No.: US 11,003,746 B1
(45) Date of Patent: May 11, 2021

(54) SYSTEMS AND METHODS FOR PREVENTING ELECTRONIC FORM DATA FROM BEING ELECTRONICALLY TRANSMITTED TO UNTRUSTED DOMAINS

(71) Applicant: CA, INC., San Jose, CA (US)

(72) Inventors: Parveen Vashishtha, Pune (IN); Siddhesh Chandrayan, Pune (IN); Karthikeyan Kasiviswanathan, Chennai (IN)

(73) Assignee: CA, Inc., San Jose, CA (US)

( * ) Notice: Subject to any disclaimer, the term of this patent is extended or adjusted under 35 U.S.C. 154(b) by 263 days.

(21) Appl. No.: 16/363,936

(22) Filed: Mar. 25, 2019

(51) Int. Cl.
G06F 21/12 (2013.01)
G06F 21/51 (2013.01)
H04L 29/06 (2006.01)
H04W 12/106 (2021.01)

(52) U.S. Cl.
CPC ............ *G06F 21/128* (2013.01); *G06F 21/51* (2013.01); *H04L 63/306* (2013.01); *H04W 12/106* (2021.01); *G06F 2221/2119* (2013.01)

(58) Field of Classification Search
CPC .................. G06F 21/128; G06F 21/51; G06F 2221/2119; H04W 12/106; H04L 63/306

USPC ............................................................ 726/2
See application file for complete search history.

(56) References Cited

U.S. PATENT DOCUMENTS

| 10,050,998 B1* | 8/2018 | Singh .................... H04L 63/145 |
| 2017/0149795 A1* | 5/2017 | Day, II ................ H04W 12/086 |
| 2019/0068638 A1* | 2/2019 | Bartik ..................... H04L 67/02 |
| 2020/0104488 A1* | 4/2020 | Li ....................... G06F 16/9566 |

* cited by examiner

*Primary Examiner* — Peter C Shaw
(74) *Attorney, Agent, or Firm* — FisherBroyles, LLP

(57) ABSTRACT

A computer-implemented method for preventing electronic form data from being electronically transmitted to untrusted domains may include (i) identifying a web page that includes an electronic form with field for data entry, (ii) detecting that the web page is electronically sending first and second messages that each include data from the field of the electronic form and that are directed to first and second destinations, respectively, (iii) determining that the first destination includes an untrusted destination, and (iv) blocking the web page from electronically sending the data from the field of the electronic form to the untrusted destination by blocking the first message from being electronically sent. Various other methods, systems, and computer-readable media are also disclosed.

18 Claims, 7 Drawing Sheets

SYSTEMS AND METHODS FOR PREVENTING ELECTRONIC FORM DATA FROM BEING ELECTRONICALLY TRANSMITTED TO UNTRUSTED DOMAINS

BACKGROUND

Millions of pieces of sensitive data are transmitted each day via the Internet. Healthcare portals, banking websites, e-commerce platforms, and others, all asks users to place their trust in the website to secure their personal data. Malicious actors constantly develop new ways to intercept personal data for exploitation, whether at the browser level, the network level, the server level, or some combination of the above. Stolen personal information can lead to anything from identity theft to fraud to blackmail and can cause severe financial and reputation damage to the legitimate website from which the information was stolen.

One type of data theft involves injecting a script into a website that copies data entered into forms and transmits that data to the attacker's domain. Unfortunately, traditional systems for preventing data transmissions may not detect this attack because the malicious code is entirely client-side, meaning that an anti-malware program that protects the web hosting server from attack may be ill-equipped to detect the malicious code. Even anti-malware programs that look in the right location may be unable to tell malicious code from benign code due to advanced code obfuscation techniques used by attackers to disguise the malicious code. Additionally, the data transmission may appear to be legitimate because it is being sent from a trusted website and contains data inputted by the user, adding a further layer of difficulty. Accordingly, the instant disclosure identifies and addresses a need for additional and improved systems and methods for preventing electronic form data from being electronically transmitted to untrusted domains.

SUMMARY

As will be described in greater detail below, the instant disclosure generally relates to systems and methods for preventing electronic form data from being electronically transmitted to untrusted domains by detecting when a web page is sending form data to two or more destinations and blocking messages containing form data that are sent to untrusted destinations.

In one example, a computer-implemented method for preventing data transmissions to untrusted domains may include (i) identifying a web page that includes an electronic form with a field for data entry, (ii) detecting that the web page is sending first and second messages that each include data from the field of the form and that are directed to first and second destinations, respectively, (iii) determining that first destination includes an untrusted destination, and (iv) blocking the web page from sending the data from the field of the form to the untrusted destination by blocking the first message from being electronically sent.

In some examples, detecting that the web page is sending the first and second messages may include detecting that the web page is sending first and second POST requests. In one embodiment, detecting that the web page is sending the first and second messages that each include the data from the field of the electronic form and that are directed to first and second destinations may include detecting that the web page is sending the first and second messages that are directed to first and second web domains, respectively.

In some examples, identifying the web page that includes the electronic form with field for data entry may include determining that the web page includes an e-commerce page. In some embodiments, determining that the web page includes the e-commerce page may include detecting at least one string in the web page that matches a predetermined list of strings associated with e-commerce pages.

In some examples, identifying the web page that includes the electronic form with field for data entry may include identifying, within source code of the web page, at least one string associated with a script that electronically sends electronic form data to malicious destinations. Additionally or alternatively, identifying the web page that includes the electronic form with field for data entry may include detecting that the electronic form includes at least one named field from a predetermined list of named fields associated with vulnerable data.

In some examples, determining that first destination includes the untrusted destination may include determining that the untrusted destination has a reputation score below a predetermined threshold for trusted reputation. In one example, determining that first destination includes the untrusted destination may include determining that the untrusted destination is not on a whitelist of trusted destinations.

Additionally or alternatively, determining that first destination includes the untrusted destination may include determining that the untrusted destination is on a blacklist of untrusted destinations. In some embodiments, blocking the web page from electronically sending the data from field of the electronic form to the untrusted destination by blocking the first message may include presenting a user with an alert about the untrusted destination.

In one embodiment, a system for implementing the above-described method may include (i) an identification module, stored in memory, that identifies a web page that includes an electronic form with field for data entry, (ii) a detection module, stored in memory, that detects that the web page is electronically sending first and second messages that each include data from the field of the electronic form and that are directed to first and second destinations, respectively, (iii) a determination module, stored in memory, that determines that first destination includes an untrusted destination, (iv) a blocking module, stored in memory, that blocks the web page from electronically sending the data from the field of the electronic form to the untrusted destination by blocking the first message from being electronically sent, and (v) at least one physical processor that executes the identification module, the detection module, the determination module, and the blocking module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a web page that includes an electronic form with field for data entry, (ii) detect that the web page is electronically sending first and second messages that each include data from the field of the electronic form and that are directed to first and second destinations, respectively, (iii) determine that the first destination includes an untrusted destination, and (iv) block the web page from electronically sending the data from the field of the electronic form to the untrusted destination by blocking the first message from being electronically sent.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
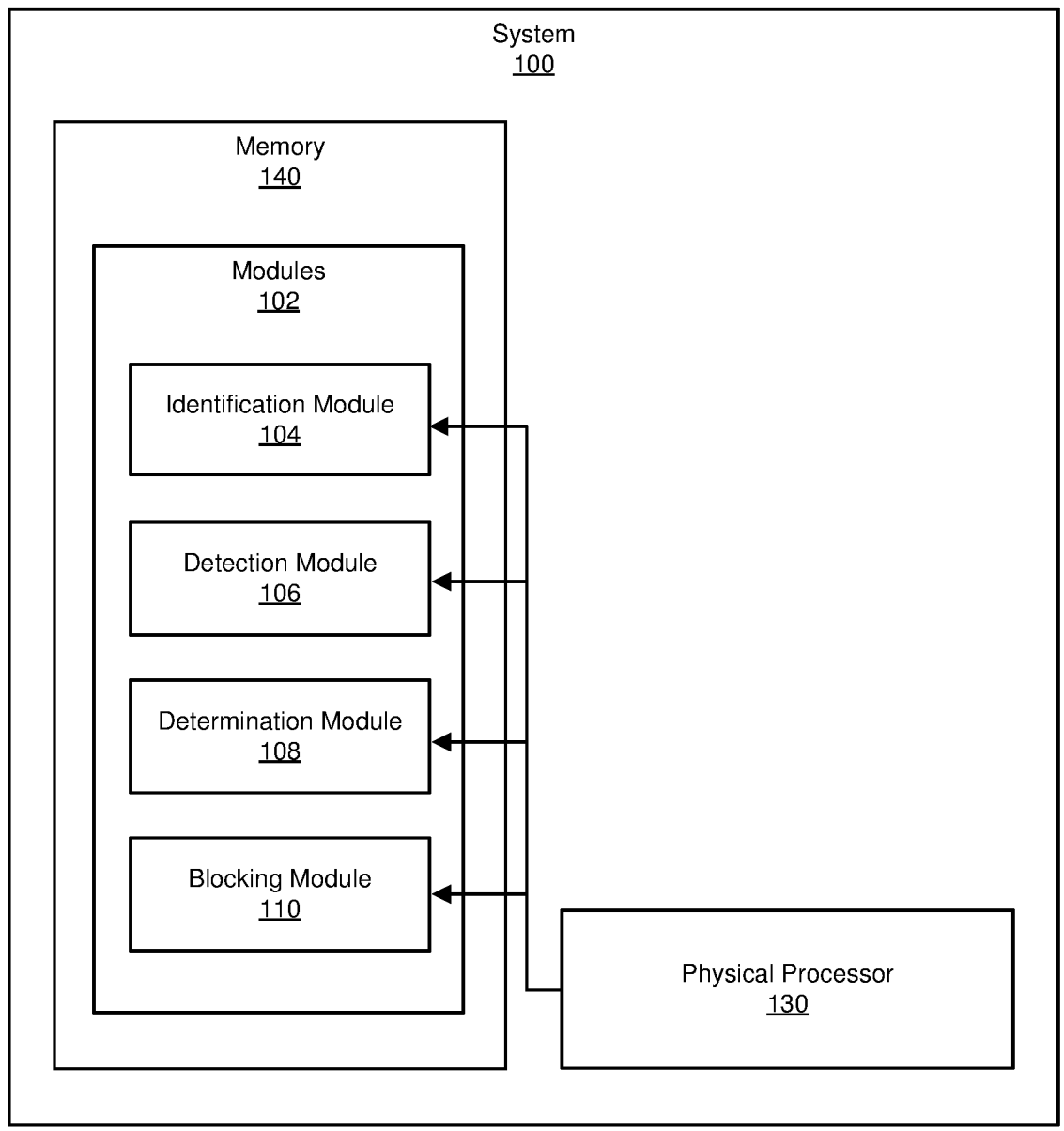
FIG. 1 is a block diagram of an exemplary system for preventing electronic form data from being electronically transmitted to untrusted domains.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing electronic form data from being electronically transmitted to untrusted domains. As will be explained in greater detail below, by monitoring web forms to determine when two or more copies of the form data are being sent to different destinations, the systems described herein may have a much lower rate of false positives because legitimate form submissions that send data only to one destination will not be blocked. Additionally, by examining web pages to determine whether the web pages are e-commerce pages and/or other pages where sensitive data is expected, the systems described herein may further reduce false positives by avoiding blocking harmless transmissions of non-sensitive data. By blocking data transmissions to untrusted destinations, the systems and methods described herein may prevent malicious actors from obtaining personal and/or sensitive data such as financial data and/or personally identifying information, increasing user security when sending data via web forms. In some embodiments, the systems described herein may improve the field of computer security and/or e-commerce by increasing the safety of e-commerce transactions.

Figure 2:
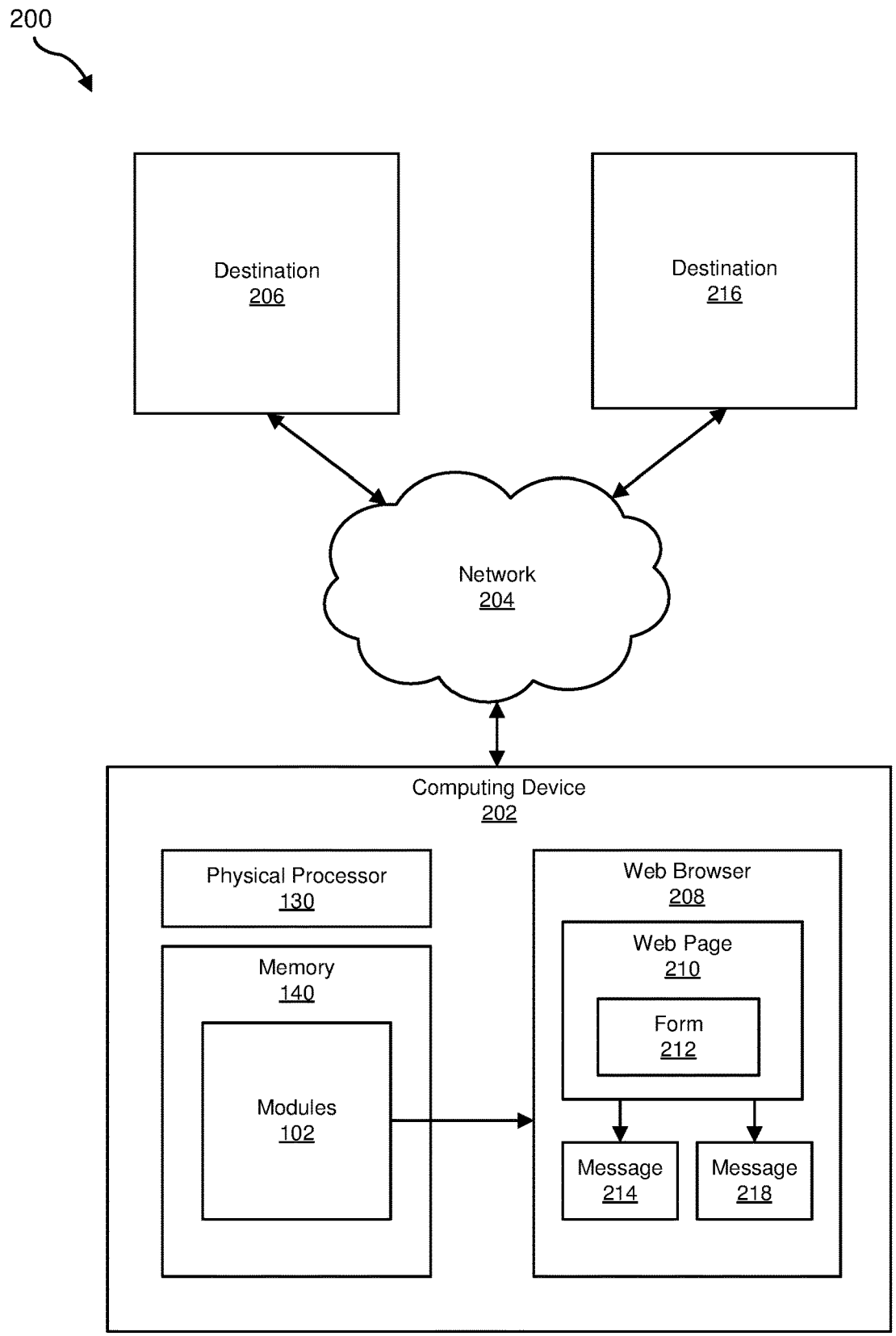
FIG. 2 is a block diagram of an additional exemplary system for preventing electronic form data from being electronically transmitted to untrusted domains.
Figure 3:
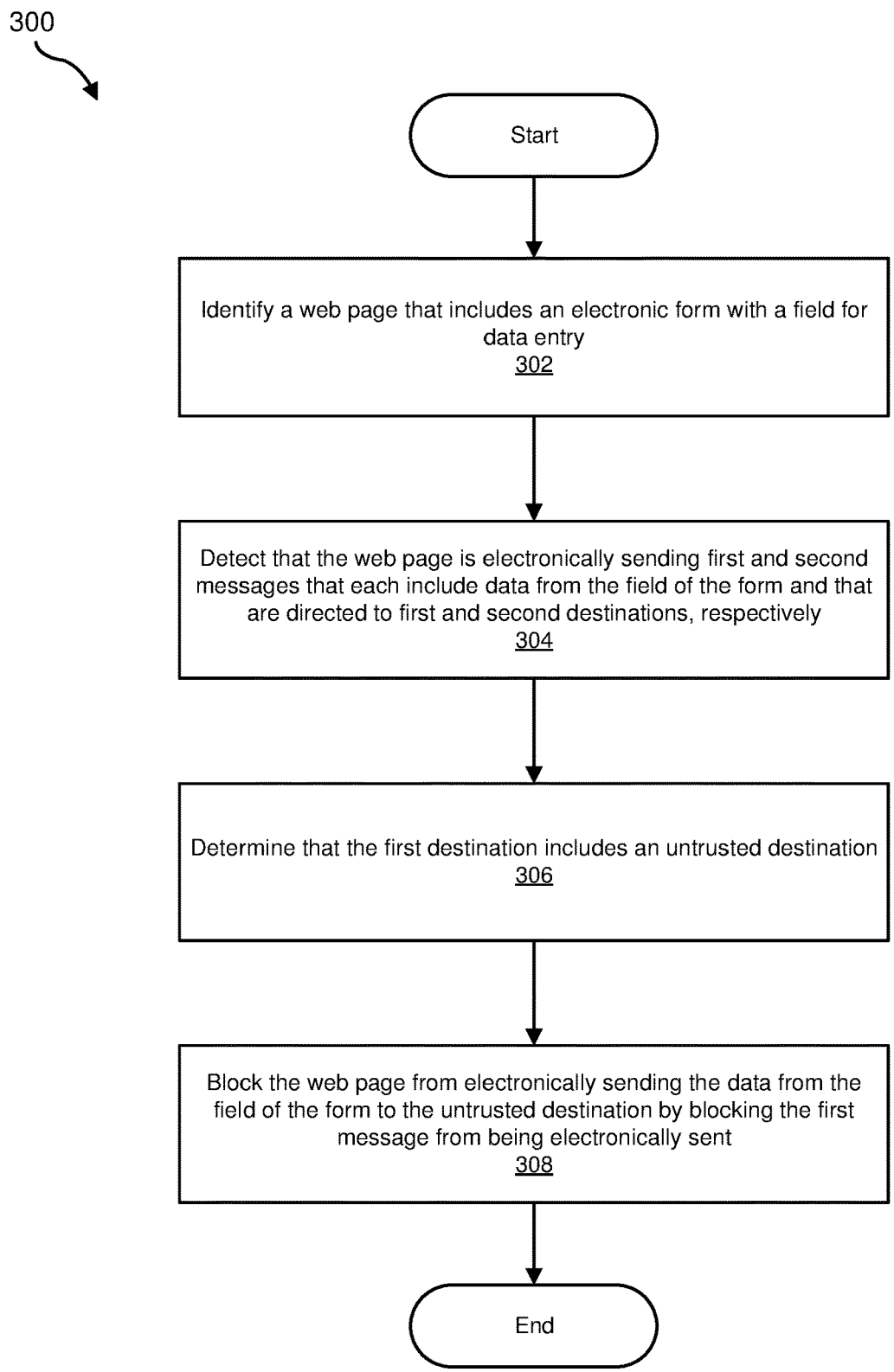
FIG. 3 is a flow diagram of an exemplary method for preventing electronic form data from being electronically transmitted to untrusted domains.
Figure 4:
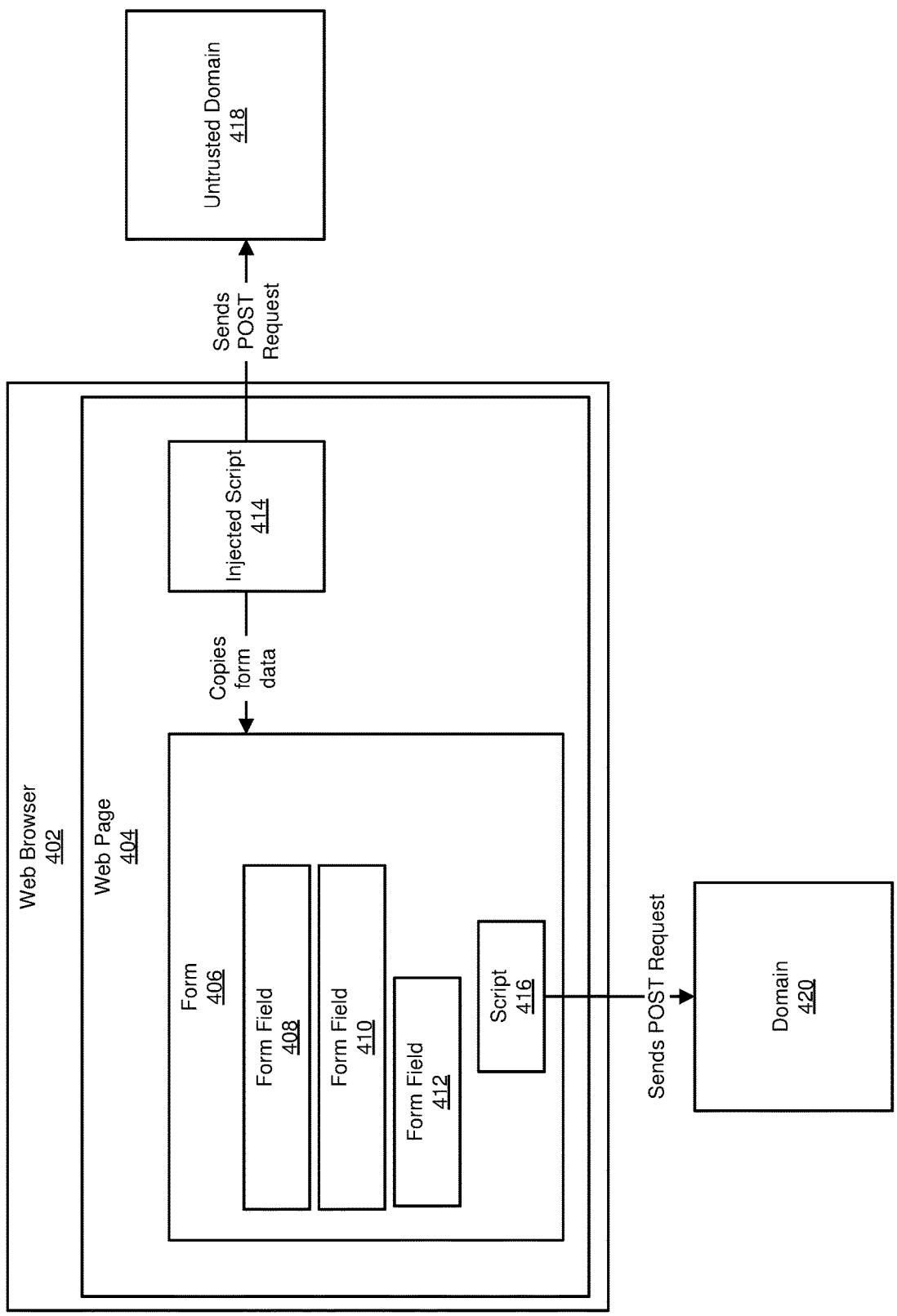
FIG. 4 is a block diagram of an example computing system for preventing electronic form data from being electronically transmitted to untrusted domains.

The following will provide, with reference to FIGS. 1, 2 and 4, detailed descriptions of exemplary systems for preventing electronic form data from being electronically transmitted to untrusted domains. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of example system 100 for preventing data transmissions to untrusted domains. As illustrated in this figure, example system 100 may include one or more modules 102 for performing one or more tasks. For example, and as will be explained in greater detail below, example system 100 may include an identification module 104 that identifies a web page that includes an electronic form with at least one field for data entry. Example system 100 may additionally include a detection module 106 that detects that the web page is electronically sending first and second messages that each include data from the field of the form and that are directed to first and second destinations, respectively. Example system 100 may also include a determination module 108 that determines that the first destination includes an untrusted destination. Example system 100 may additionally include a blocking module 110 that blocks the web page from electronically sending the data from the field of the form to the untrusted destination by blocking the first message from being electronically sent. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a destination 206 and/or a destination 2016 via a network 204. In one example, computing device 202 may be programmed with one or more of modules 102.

In one embodiment, one or more of modules 102 from FIG. 1 may, when executed by at least one processor of computing device 202, enable computing device 202 and/or server 206 to prevent data transmissions to untrusted domains. For example, and as will be described in greater detail below, one or more of modules 102 may cause computing device 202 to prevent data transmissions to untrusted domains. For example, and as will be described in greater detail below, identification module 104 may identify a web page 210 that includes a form 212 with at least one field for data entry. In some embodiments, identification module 104 may identify web page 210 via a browser 2108. Detection module 106 may detect that web page 210 is sending message 214 and message 218 that each include data from the field of form 212 and that are directed to destination 206 and/or destination 216, respectively. In some examples, determination module 108 may determine that destination 216 includes an untrusted destination. In response, blocking module 110 may block web page 210 from electronically sending the data from the field of form 212 to destination 216 by blocking message 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and destination 206 and/or destination 216.

FIG. 3 is a flow diagram of an exemplary computer-implemented method 300 for preventing electronic form data from being electronically transmitted to untrusted domains. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a web page that may include an electronic form with field for data entry. For example, identification module 104 may, as part of computing device 202 in FIG. 2, identify web page 210 that may include form 212 with a field for data entry.

Identification module 104 may identify web page 210 in a variety of ways and/or contexts. For example, identification module 104 may be part of a browser plug-in that may examine web pages for malicious code and/or other characteristics. In some embodiments, identification module 104 may examine the source code of the web page for one or more strings that indicate the type of web page, the presence a form on the web page, and/or the potential presence of malicious code on the web page.

In some examples, identification module 104 may identify the web page that includes the form with the at least one field for data entry by identifying, within source code of the web page, at least one string associated with a script that sends form data to malicious destinations. For example, identification module 104 may search the source code of the web page for the string "querySelectorAll( )" that calls a JavaScript function that enables attackers to identify form fields in a web page. Additionally or alternatively, identification module 104 may search for other strings that may be commonly found in web pages containing forms and/or scripts that copy form data, such as "input," "select," "textarea," "checkbox," and/or "button."

In some examples, identification module 104 may identify the web page that includes the form with the at least one field for data entry by detecting that the form includes at least one named field from a predetermined list of named fields associated with vulnerable data. For example, identification module 104 may check the "name" attribute of a hypertext markup language (HTML) form field to determine whether the name is on a predetermined list of form field names that indicate vulnerable data. In one example, identification module 104 may check for names including but not limited to "login," "password," "creditcard," "address," "routingnumber," "account," and/or variations of such names (e.g., "credit_card," "creditCard," etc.).

In some examples, identification module 104 may identify the web page that by determining that the web page includes an e-commerce page and/or other type of page likely to request sensitive data. The term "e-commerce page," as used herein, generally refers to any web page that facilitates the purchase of goods and/or services by requesting payment information from a user. In some examples, identification module 104 may determine that the web page is an e-commerce page by detecting at least one string in the web page that matches a predetermined list of strings associated with e-commerce pages. For example, identification module 104 may detect a string such as "checkout," "payment," and/or "cart" in the text and/or source code of the web page.

In some embodiments, identification module 104 may identify web pages that are likely to be the targets of formjacking attempts. The term "formjacking," as used herein, refers to a type of attack where an attacker injects script into a web page that copies the data from a form on the web page and then sends that data to a destination accessible to the attacker. As illustrated in FIG. 4, in some embodiments, a web browser 402 may load a web page 404 that includes a form 406 with form fields 408, 410, and/or 412. In some embodiments, form 406 may be submitted by a script 416 and/or send data via a POST request to a domain 410 associated with web page 404. In one example, an attacker may inject an injected script 414 that copies data from form 406 and sends the data via a POST request to an untrusted domain 418 that is accessible to the attacker. The attacker may inject injected script 414 in a variety of ways based on what type of vulnerability exists on web page 404 (e.g., cross site scripting).

In some examples, identification module 104 may identify a string such as "querySelectorAll( )" in injected script 414 that indicates that injected script 414 may be part of a formjacking attack. Additionally or alternatively, identification module 104 may examine the name attributes of form fields 408, 410, and/or 412 to determine whether form 406 collects sensitive data. In one embodiment, identification module 104 may be part of a plug-in and/or extension in web browser 402.

Returning to FIG. 3, at step 304, one or more of the systems described herein may detect that the web page is electronically sending two or more messages that each include data from the field of the form and that are directed to first and second destinations. For example, detection module 106 may, as part of computing device 202 in FIG. 2, detect that web page 210 is electronically sending message 214 and message 218 that each include data from the field of form 212 and that are directed to destination 206 and destination 216, respectively.

The term "destination," as used herein, generally refers to any identifier of the recipient of a message that includes data. For example, a destination may include a web server, an Internet Protocol (IP) address, a domain and/or a domain name.

The term "message," as used herein, generally refers to any transmission of data. In some embodiments, a message may be a hypertext transfer protocol (HTTP) and/or hypertext transfer protocol secure (HTTPS) message. In one embodiment, detection module 106 may monitor and/or detect a specific type of message while ignoring other types of messages. For example, detection module 106 may detect HTTP and/or HTTPS POST requests.

Detection module 106 may detect that the web page is sending two or more messages that each include data from the form and that are directed to first and second destinations in a variety of ways and/or contexts. For example, detection module 106 may be part of a web browser extension and/or plug-in and may monitor outgoing messages sent via the web browser. In some examples, detection module 106 may detect that the web page is sending the first and second messages by detecting that the web page is sending two or more POST requests.

In one embodiment, detection module 106 may detect that the web page is sending the first and second messages that are directed first and second web domains, respectively. For example, detection module 106 may detect that the web page is sending a message directed towards a web domain that is associated with the web page (e.g., that matches the domain of the web page and/or is owned by the same entity) and/or that the web page is sending a message directed towards a web domain that is not associated with the web page.

At step 306, one or more of the systems described herein may determine that the first destination includes an untrusted destination. For example, determination module 108 may, as part of computing device 202 in FIG. 2, determine that destination 216 includes an untrusted destination.

Determination module 108 may determine that the destination includes an untrusted destination in a variety of ways and/or contexts. For example, determination module 108 may determine that the untrusted destination has a reputation score below a predetermined threshold for trusted reputation. For example, determination module 108 may compare a numerical and/or percentage-based reputation score for the destination with a predetermined threshold. Additionally or alternatively, determination module 108 may determine that the destination has been categorized and/or tagged as untrusted by a destination reputation repository.

In some examples, determination module 108 may determine the untrusted destination is untrusted by determining that the untrusted destination is not on a whitelist of trusted destinations. For example, determination module 108 may determine that any destination that is not on the whitelist is an untrusted destination. Additionally or alternatively, determination module 108 may determine that the destinations is untrusted by determining that the untrusted destination is on a blacklist of untrusted destinations.

At step 308, one or more of the systems described herein may block the web page from electronically sending the data from the field of the form to the untrusted destination by blocking the first message from being electronically sent. For example, blocking module 110 may, as part of computing device 202 in FIG. 2, block web page 210 from electronically sending the data from the field of form 212 to destination 216 by blocking message 218.

Blocking module 110 may block the web page from sending the data to the untrusted destination in a variety of ways and/or contexts. For example, blocking module 110 may be part of a browser extension and/or plug-in that blocks the browser from sending HTTP and/or HTTPS messages, such as POST requests, that include form data and/or are directed at untrusted destinations.

In some examples, blocking module 110 may present a user with an alert about the untrusted destination. For example, blocking module 110 may present a user with pop-up alert and/or notification that includes the domain to which the message is directly and/or the contents of the message. In some examples, blocking module 110 may present the user with a choice as to whether to block or allow the message.

Figure 5:
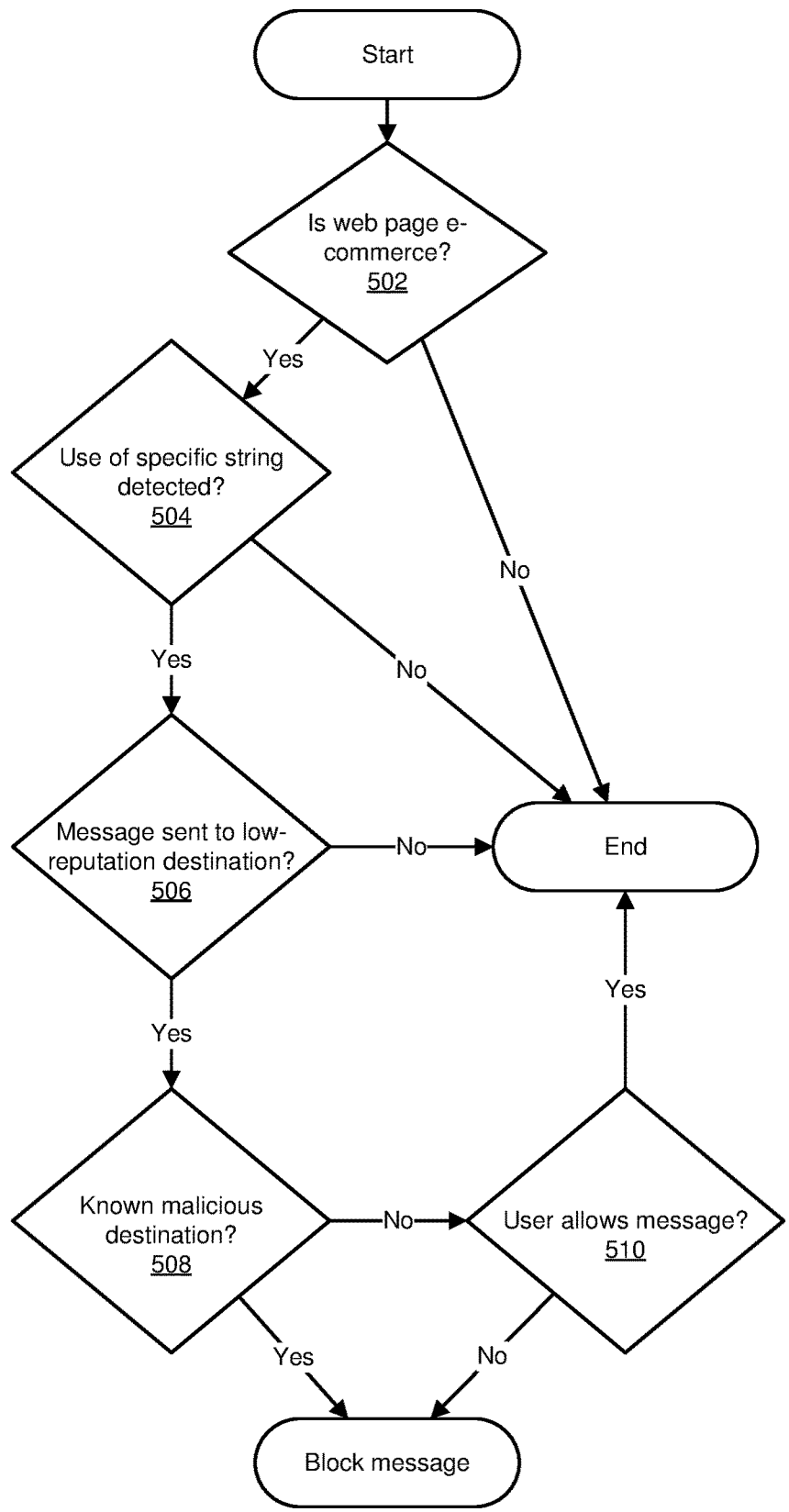
FIG. 5 is a flow diagram of an exemplary method for preventing electronic form data from being electronically transmitted to untrusted domains.

In some embodiments, the systems described herein may go through a number of steps to determine whether to block or allow a message. For example, as illustrated in FIG. 5, at step 502, the systems described herein may determine whether the web page is an e-commerce page. If the web page is not an e-commerce page, the systems described herein may cease examining and/or monitoring the web page. If the web page is an e-commerce page, at step 504, the systems described herein may determine whether a specific string that indicates a potential formjacking attack is detected on the page. If so, at step 506, the systems described herein may monitor the web page to determine if the web page sends at least two messages, at least one of which is directed to a low-reputation destination. If, at step 508, the systems described herein determine that the destination is a known malicious destination, the systems described herein may block the message. Otherwise, at step 510, the systems described herein may alert a user to the suspicious message and determine, based on the user's response (e.g., clicking a button on a dialogue box), whether the user allows the message. If the user does not allow the message, the systems described herein may block the message.

As explained above in connection with method 300 in FIG. 3, the systems and methods described herein may block formjacking attacks with comparatively few false positives by identifying e-commerce sites, examining the source code for strings common in formjacking attempts, and intercepting any instances of two or more POST requests sent from the same page to determine whether one or more of the POST requests is directed at an untrusted domain. By only blocking POST requests when two or more POST requests are being sent from the same page, the systems described herein may avoid blocking innocuous requests that are not caused by formjacking scripts. Because the systems and methods described herein are browser-based, the systems and methods described herein may be able to examine browser requests that are opaque to network-based security tools (e.g., because the traffic is HTTPS). By using the context surrounding the page (e.g., type of page, number of requests sent) and searching for minimal strings related to formjacking rather than searching for the majority or entirety of a known formjacking script (e.g., based on a signature), the systems described herein may block formjacking attempts even if the formjacking code is highly obfuscated and difficult to identify. By blocking formjacking attempts, the systems and methods described herein may protect user data from malicious actors and help users avoid identity theft, fraud, and/or other negative consequences.

Figure 6:
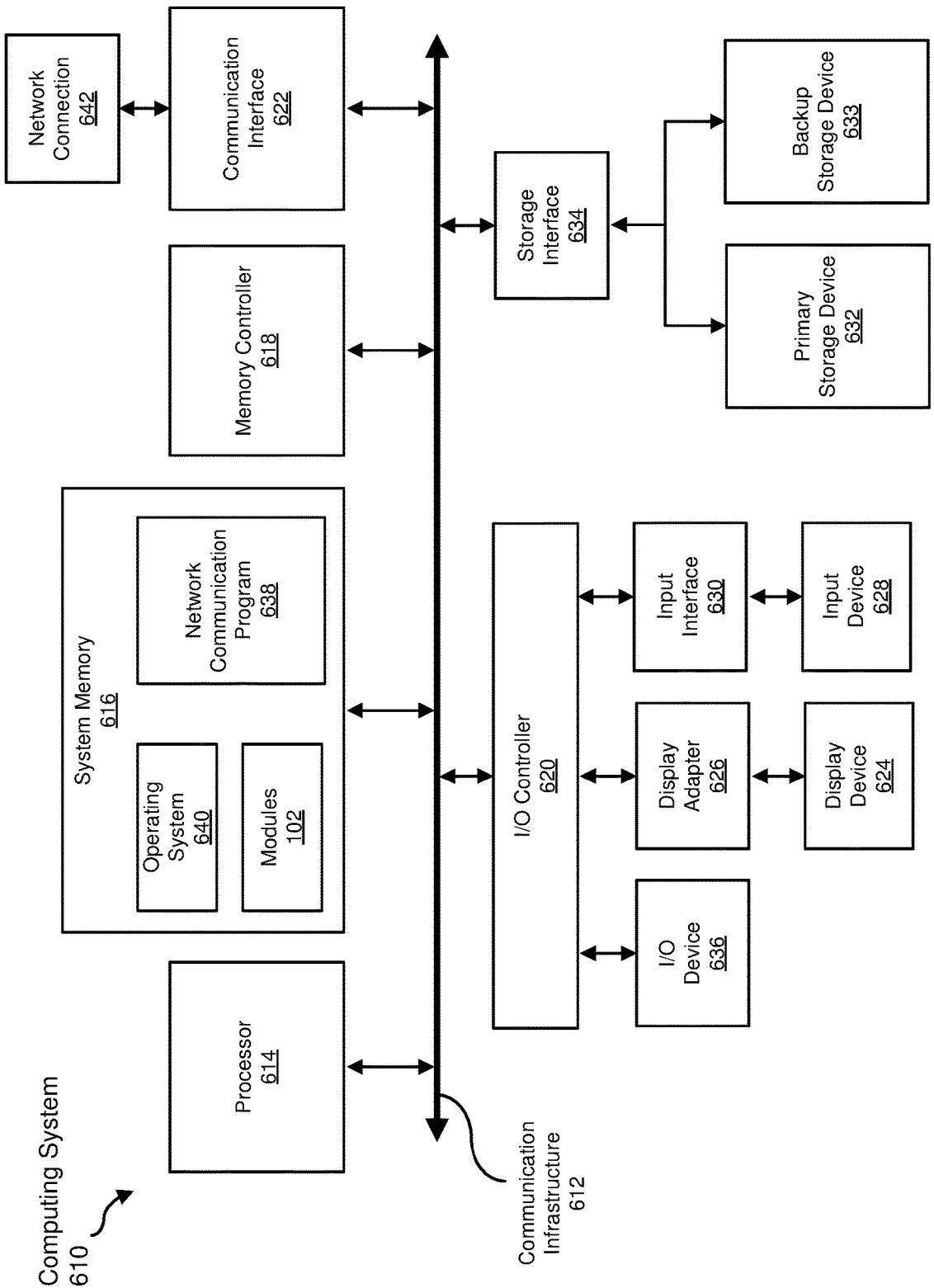
FIG. 6 is a block diagram of an exemplary computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
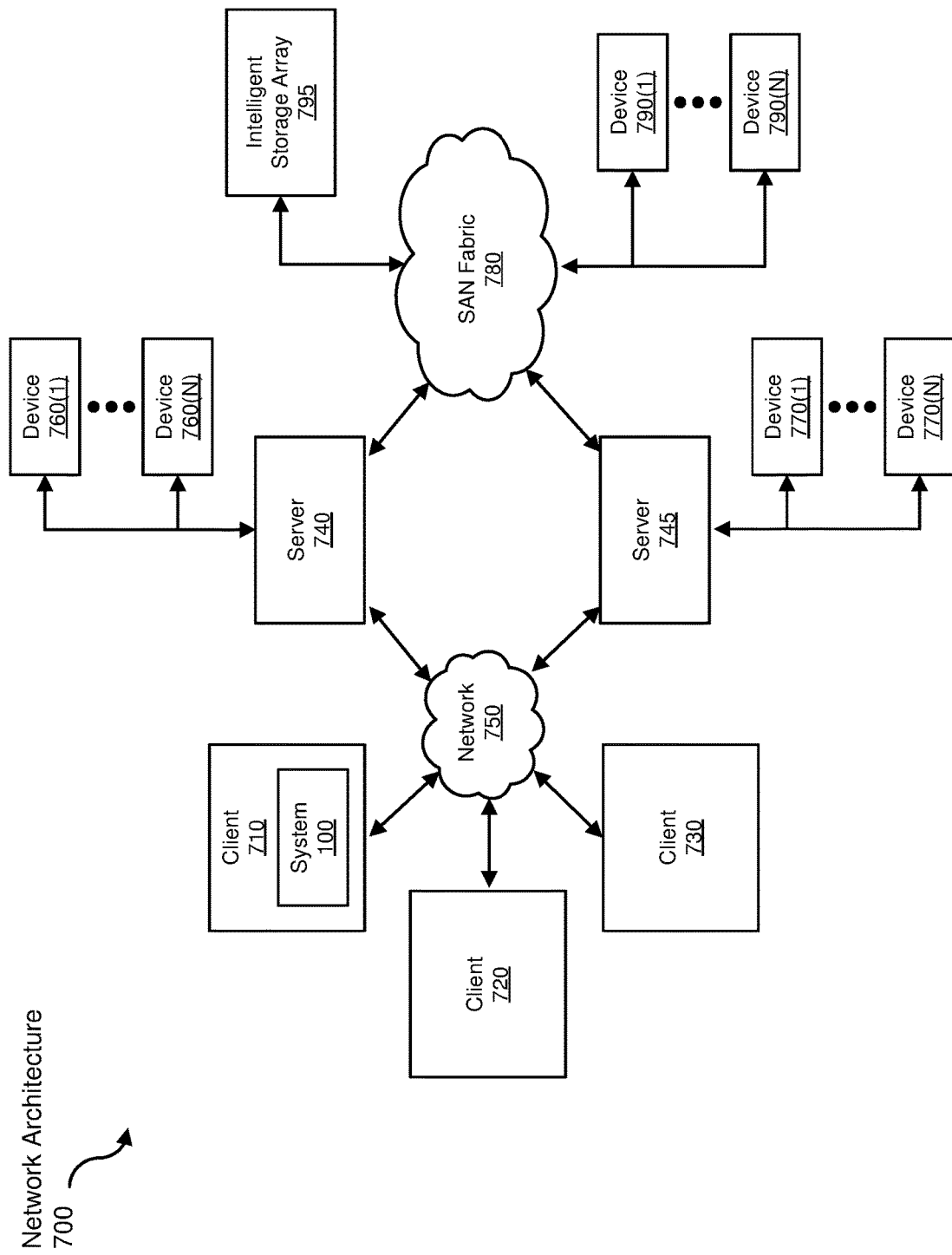
FIG. 7 is a block diagram of an exemplary computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing electronic form data from being electronically transmitted to untrusted domains.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive form data to be transformed, transform the form data by examining strings within the form data and/or destinations of the form data, output a result of the transformation to determine if potentially sensitive data is being sent to an untrusted domain, use the result of the transformation to prevent sensitive data from being sent to an untrusted domain, and store the result of the transformation to increase the data set of a reputation server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing electronic form data from being electronically transmitted to untrusted domains, at least a portion of the method being performed by a computing device comprising at least one processor, the method comprising:
   identifying a web page that comprises an electronic form with a field for data entry, the field for data entry comprising at least one named field from a predetermined list of named fields associated with vulnerable data;
   detecting that the web page is electronically sending first and second messages that each comprise data from the field of the form and that are directed to first and second destinations, respectively;
   determining that the first destination comprises an untrusted destination; and
   blocking the web page from electronically sending the data from the field of the form to the untrusted destination by blocking the first message from being electronically sent.

2. The computer-implemented method of claim 1, wherein
   detecting that the web page is electronically sending the first and second messages comprises detecting that the web page is electronically sending first and second POST requests.

3. The computer-implemented method of claim 1, wherein
   detecting that the web page is electronically sending the first and second messages that each comprise the data from the field of the electronic form and that are directed to the first and second destinations comprises detecting that the web page is electronically sending the first and second messages that are directed to first and second web domains, respectively.

4. The computer-implemented method of claim 1, wherein
identifying the web page that comprises the electronic form with the field for data entry comprises determining that the web page comprises an e-commerce page.

5. The computer-implemented method of claim 4, wherein
determining that the web page comprises the e-commerce page comprises detecting at least one string in the web page that matches a predetermined list of strings associated with e-commerce pages.

6. The computer-implemented method of claim 1, wherein
identifying the web page that comprises the electronic form with the field for data entry comprises identifying, within source code of the web page, at least one string associated with a script that electronically sends electronic form data to malicious destinations.

7. The computer-implemented method of claim 1, wherein
determining that the first destination comprises the untrusted destination comprises determining that the untrusted destination has a reputation score below a predetermined threshold for trusted reputation.

8. The computer-implemented method of claim 1, wherein
determining that the first destination comprises the untrusted destination comprises determining that the untrusted destination is not on a whitelist of trusted destinations.

9. The computer-implemented method of claim 1, wherein
determining that the first destination comprises the untrusted destination comprises determining that the untrusted destination is on a blacklist of untrusted destinations.

10. The computer-implemented method of claim 1, wherein blocking the web page from electronically sending the data from the field of the electronic form to the untrusted destination by blocking the first message comprises presenting a user with an alert about the untrusted destination.

11. A system for preventing data transmissions to untrusted domains, the system comprising:
an identification module, stored in memory, that identifies a web page that comprises an electronic form with a field for data entry, the field for data entry comprising at least one named field from a predetermined list of named fields associated with vulnerable data;
a detection module, stored in memory, that detects that the web page is electronically sending first and second messages that each comprise data from the field of the electronic form and that are directed to first and second destinations, respectively;
a determination module, stored in memory, that determines that the first destination comprises an untrusted destination;

a blocking module, stored in memory, that blocks the web page from electronically sending the data from the field of the electronic form to the untrusted destination by blocking the first message from being electronically sent; and
at least one physical processor that executes the identification module, the detection module, the determination module, and the blocking module.

12. The system of claim 11, wherein the detection module detects that the web page is electronically sending the first and second messages by detecting that the web page is electronically sending first and second POST requests.

13. The system of claim 11, wherein the detection module detects that the web page is electronically sending the first and second messages that each comprise the data from the field of the electronic form and that are directed to the first and second destinations by detecting that the web page is electronically sending the first and second messages that are directed to first and second web domains, respectively.

14. The system of claim 11, wherein the identification module identifies the web page that comprises the electronic form with the field for data entry by determining that the web page comprises an e-commerce page.

15. The system of claim 14, wherein the determination module determines that the web page comprises the e-commerce page by detecting at least one string in the web page that matches a predetermined list of strings associated with e-commerce pages.

16. The system of claim 11, wherein the identification module identifies the web page that comprises the electronic form with the field for data entry comprises identifying, within source code of the web page, at least one string associated with a script that sends electronic form data to malicious destinations.

17. The system of claim 11, wherein the determination module determines that the first destination comprises the untrusted destination by determining that the untrusted destination has a reputation score below a predetermined threshold for trusted reputation.

18. A non-transitory computer-readable medium comprising one or more computer-readable instructions that, when executed by at least one processor of a computing device, cause the computing device to:
identify a web page that comprises an electronic form with a field for data entry, the field for data entry comprising at least one named field from a predetermined list of named fields associated with vulnerable data;
detect that the web page is electronically sending first and second messages that each comprise data from the field of the electronic form and that are directed to first and second destinations, respectively;
determine that the first destination comprises an untrusted destination; and
block the web page from electronically sending the data from the field of the electronic form to the untrusted destination by blocking the first message from being electronically sent.

\* \* \* \* \*